US012776466B2

(12) United States Patent
Hwang et al.

(10) Patent No.: US 12,776,466 B2
(45) Date of Patent: Oct. 27, 2026

(54) MANIPULATOR FOR GAS-INSULATED SWITCHGEAR

(71) Applicant: HYOSUNG HEAVY INDUSTRIES CORPORATION, Seoul (KR)

(72) Inventors: Seong Taek Hwang, Gimhae-si (KR); Ming Jung Yu, Changwon-si (KR)

(73) Assignee: HYOSUNG HEAVY INDUSTRIES CORPORATION, Seoul (KR)

(*) Notice: Subject to any disclaimer, the term of this patent is extended or adjusted under 35 U.S.C. 154(b) by 290 days.

(21) Appl. No.: 18/291,189

(22) PCT Filed: Nov. 29, 2022

(86) PCT No.: PCT/KR2022/019053
§ 371 (c)(1),
(2) Date: Jan. 22, 2024

(87) PCT Pub. No.: WO2023/146103
PCT Pub. Date: Aug. 3, 2023

(65) Prior Publication Data
US 2024/0304405 A1 Sep. 12, 2024

(30) Foreign Application Priority Data
Jan. 25, 2022 (KR) ........................ 10-2022-0010441

(51) Int. Cl.
*H01H 71/10* (2006.01)
*H01H 33/30* (2006.01)
*H01H 33/42* (2006.01)

(52) U.S. Cl.
CPC ...... *H01H 71/1009* (2013.01); *H01H 33/302* (2013.01); *H01H 33/42* (2013.01)

(58) Field of Classification Search
CPC .. H01H 3/26; H01H 3/40; H01H 3/44; H01H 3/46; H01H 33/302; H01H 33/42; H01H 33/666; H01H 71/1009; H02B 13/035
(Continued)

(56) References Cited

U.S. PATENT DOCUMENTS 7,650,816 B2 1/2010 Chyla et al.
8,395,067 B2 * 3/2013 Marushima .......... H01H 3/3031 200/318
(Continued)

FOREIGN PATENT DOCUMENTS

FR 2 704 614 A1 11/1994
KR 10-0873732 B1 12/2008
(Continued)

OTHER PUBLICATIONS

Translation of KR200446093 (Original document published on Sep. 25, 2009) (Year: 2009).*
(Continued)

*Primary Examiner* — William A Bolton
(74) *Attorney, Agent, or Firm* — Goldilocks ZONE IP LAW

(57) ABSTRACT

A manipulator according to an embodiment may comprise: a housing; a rotary unit which is disposed in the housing and has a first rotating shaft; and a linear unit at least a part of which is disposed in the housing and which performs linear motion with respect to a breaker, wherein one side of the linear unit may be connected to the breaker and the other side of the linear unit may be connected to a part of the rotary unit.

12 Claims, 4 Drawing Sheets

(58) Field of Classification Search
USPC ........ 218/154, 153, 140, 14, 78, 84, 92, 120
See application file for complete search history.

(56) References Cited

U.S. PATENT DOCUMENTS

| | | | | |
|---|---|---|---|---|
| 8,963,039 | B2 * | 2/2015 | Ohda | H01H 33/565<br>218/78 |
| 9,263,200 | B2 * | 2/2016 | Zehnder | H01H 33/008 |
| 2004/0211757 | A1 | 10/2004 | Kawamoto et al. | |
| 2014/0076854 | A1 * | 3/2014 | Okubo | H01H 33/42<br>218/154 |
| 2014/0231391 | A1 * | 8/2014 | Iwasawa | H01H 33/40<br>218/78 |
| 2015/0380179 | A1 * | 12/2015 | Hashimoto | H01H 3/46<br>200/290 |
| 2018/0211802 | A1 | 7/2018 | Park | |

FOREIGN PATENT DOCUMENTS

| | | | | |
|---|---|---|---|---|
| KR | 20-0446093 | Y1 | 9/2009 | |
| KR | 10-1072547 | B1 | 10/2011 | |
| KR | 10-2012-0073697 | A | 7/2012 | |
| KR | 20130072147 | A * | 7/2013 | H01H 33/42 |

OTHER PUBLICATIONS

Translation of KR20130072147 (Original document published on Jul. 1, 2013) (Year: 2013).*
The EESR issued by the European Patent Office on Dec. 16, 2025 for the corresponding EP Patent Application No. 22924356.3.

* cited by examiner

MANIPULATOR FOR GAS-INSULATED SWITCHGEAR

CROSS-REFERENCE TO RELATED APPLICATIONS

This application claims the benefit under 35 U.S.C. section 371, of PCT International Application No. PCT/KR2022/019053, filed on Nov. 29, 2022, which claims foreign priority to Korean Patent Application No. 10-2022-0010441, filed on Jan. 25, 2022, in the Korean Intellectual Property Office, both of which are hereby incorporated by reference in their entireties.

TECHNICAL FIELD

The following embodiments relate to a manipulator for gas-insulated switchgear.

BACKGROUND ART

A gas-insulated switchgear (GIS) refers to a switchgear system that protects a conductor and device stored inside a metal tank using an insulating medium. In general, sulfur hexafluoride (SF6) gas, which has an excellent insulation performance and arc-suppression function and thus functions as an insulating gas, may be used as an insulation medium for the GIS. The insulating gas may be sealed and filled inside the GIS.

In general, the GIS includes a breaker, a disconnector, a grounding switch, a lightning arrester, a main circuit busbar, etc.

The above description is information the inventor(s) acquired during the course of conceiving the present disclosure, or already possessed at the time, and is not necessarily art publicly known before the present application was filed.

DISCLOSURE OF THE INVENTION

Technical Goals

An aspect according to an embodiment is to provide a manipulator that may effectively manipulate equipment of a gas-insulated switchgear (GIS).

An aspect according to an embodiment is to provide a manipulator that may transmit a rotational motion of the manipulator directly to the equipment of the GIS.

An aspect according to an embodiment is to provide a manipulator with a high energy transfer efficiency when manipulating the equipment of the GIS.

An aspect according to an embodiment is to provide a manipulator that has a simple configuration and thus reduce cost and size.

Technical Solutions

A manipulator according to an embodiment may include a housing, a rotation unit disposed in the housing and having a first rotation axis, and a linear unit of which at least a portion is disposed in the housing and which performs a linear motion with respect to the breaker, wherein one side of the linear unit may be connected to the breaker and an other side of the linear unit may be connected to a first portion of the rotation unit.

A hole may be formed in one of the other side of the linear unit and the first portion of the rotation unit, a pin may protrude from the other of the other side of the linear unit and the first portion of the rotation unit and pass through the hole, and the pin may not be constrained in the hole.

The hole may be a slot having an oval shape.

The manipulator may further include a blocking induction portion configured to induce blocking of a current and an input induction portion configured to induce input of a current, wherein a portion of the blocking induction portion may be connected to a second portion of the rotation unit and a portion of the input induction portion may be connected to a third portion of the rotation unit.

The blocking induction portion may be configured to induce blocking of a current by rotating the rotation unit in a determined direction, the input induction portion may be configured to induce input of a current by rotating the rotation unit in another direction, and the linear unit may be configured to be displaced away from the breaker when blocking of a current is induced and displaced toward the breaker when input of a current is induced.

The blocking induction portion may include a blocking spring and a blocking rod disposed in the blocking spring in a longitudinal direction of the blocking spring, wherein the blocking rod may be connected to the rotation unit through a pin-hole connection and the blocking spring may be configured to displace the blocking rod by extending from a loaded state.

A hole of the pin-hole connection of the blocking rod to the rotation unit may be a slot having an oval shape.

The input induction portion may include an input motor, an input sprocket driven by the input motor and having a second rotation axis, and an input rod of which one side is connected to the input sprocket, wherein an other side of the input rod may be connected to the rotation unit through a pin-hole connection.

The input induction portion may include an input motor, an input sprocket driven by the input motor and having a second rotation axis, and an input cam coupled to the input sprocket, wherein the input cam may be connected to the third portion of the rotation unit through a sliding contact, configured to rotate as the input sprocket rotates, and configured to rotate the rotation unit by pushing the third portion of the rotation unit.

The rotation unit may include a first arm connected to the linear unit, a second arm located on an opposite side of the first arm with respect to the first rotation axis, a third arm located on one side with respect to a line connecting the first arm and the second arm, and a fourth arm located on an other side with respect to the line, wherein the blocking induction portion may further include a checker configured to selectively fix the second arm, wherein the third arm may be connected to the blocking rod, and wherein the fourth arm may be connected to the input cam.

Effects

A manipulator according to an embodiment may effectively manipulate equipment of a gas-insulated switchgear (GIS).

A manipulator according to an embodiment may transmit a rotational motion of the manipulator directly to the equipment of the GIS.

A manipulator according to an embodiment may have a high energy transfer efficiency when manipulating the equipment of the GIS.

A manipulator according to an embodiment may have a simple configuration and may thus reduce cost and size.

The effects of the manipulator according to an embodiment are not limited to the above-mentioned effects, and other unmentioned effects can be clearly understood from the following description by one of ordinary skill in the art to which the present disclosure pertains.

BRIEF DESCRIPTION OF DRAWINGS

The above and other aspects, features, and advantages of embodiments of the disclosure will be more apparent from the following detailed description, taken in conjunction with the accompanying drawings, in which.

BEST MODE FOR CARRYING OUT THE INVENTION

Figure 1:
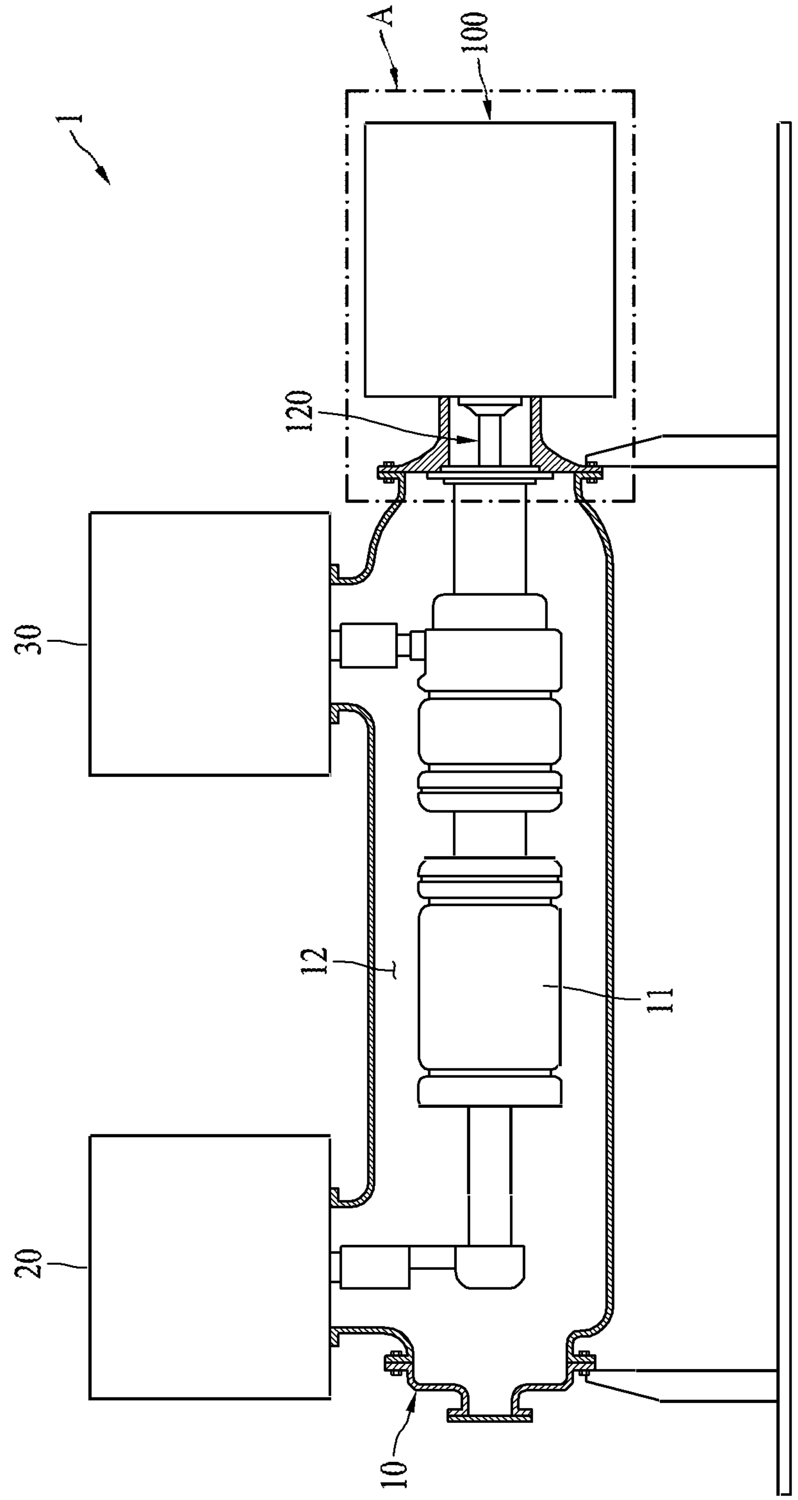
FIG. 1 is a diagram schematically illustrating a gas-insulated switchgear (GIS) including a manipulator according to an embodiment.

Hereinafter, embodiments are described in detail with reference to the accompanying drawings. However, various alterations and modifications may be made to the embodiments. Here, the embodiments are not meant to be limited by the descriptions of the present disclosure. The embodiments should be understood to include all changes, equivalents, and replacements within the idea and the technical scope of the disclosure.

The terminology used herein is for the purpose of describing particular embodiments only and is not intended to be limiting. The singular forms "a," "an," and "the" are intended to include the plural forms as well, unless the context clearly indicates otherwise. It should be further understood that the terms "comprises/comprising" and/or "includes/including," when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical or scientific terms used herein have the same meaning as those commonly understood by one of ordinary skill in the art to which the examples belong. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

When describing the embodiments with reference to the accompanying drawings, like reference numerals refer to like components and a repeated description related thereto is omitted. In the description of embodiments, detailed description of well-known related structures or functions is omitted when it is deemed that such description may cause ambiguous interpretation of the present disclosure.

In addition, in the description of the components of the embodiments, terms such as first, second, A, B, (a), (b), and the like may be used. These terms are used only for the purpose of discriminating one component from another component, and the nature, the sequences, the orders, or the like of the components are not limited by the terms. It is to be understood that if a component is described as being "connected," "coupled," or "joined" to another component, the former may be directly "connected," "coupled," or "joined" to the latter or "connected," "coupled," or "joined" to the latter via another component.

The same name may be used to describe components having a common function in different embodiments. Unless otherwise mentioned, the description of one embodiment may be applicable to other embodiments. Thus, duplicated description is omitted for conciseness.

FIG. 1 is a diagram schematically illustrating a gas-insulated switchgear (GIS) 1 including a manipulator 100 according to an embodiment. The GIS 1, which may include the manipulator 100 according to an embodiment, may include a breaker 10, a disconnector 20, and the manipulator 100 as described above.

As described above, the GIS 1 may include the equipment described above such as a busbar in a metal container, which may be sealed with $SF_6$ gas filled therein.

The breaker 10, also referred to as a circuit breaker, is a main module of the GIS 1. An internal device 11 to be protected may be located in the breaker 10. In addition, the breaker 10 may include a gas space 12 in which $SF_6$ gas may diffuse. By the operation of the breaker 10, $SF_6$ gas may diffuse in the gas space 12 and thus the electricity may be quickly cut off.

For example, a grounding switchgear 30 or a disconnector 20 may be located on one side of the breaker 10.

The grounding switchgear 30 may be a switchgear that may maintain a grounding state of the GIS 1.

Referring to FIG. 1, the manipulator 100 according to an embodiment is shown to be located on one side of the breaker 10 and manipulate the breaker 10, but the position of the manipulator 100 may be other positions in the GIS 1 besides the position for manipulating the breaker 10. For example, the manipulator 100 may be connected to a position for manipulating the disconnector 20 or the ground switchgear 30.

The manipulator 100 according to the following embodiment is described as manipulating the breaker 10, but the manipulator 100 is not limited thereto and may manipulate other equipment.

Referring to FIG. 1, the manipulator 100 according to an embodiment may include a linear unit 120. The linear unit 120 may make a linear motion toward or away from a manipulation object, for example, the breaker 10, and may cut off or input electricity through the linear motion.

Figure 2:
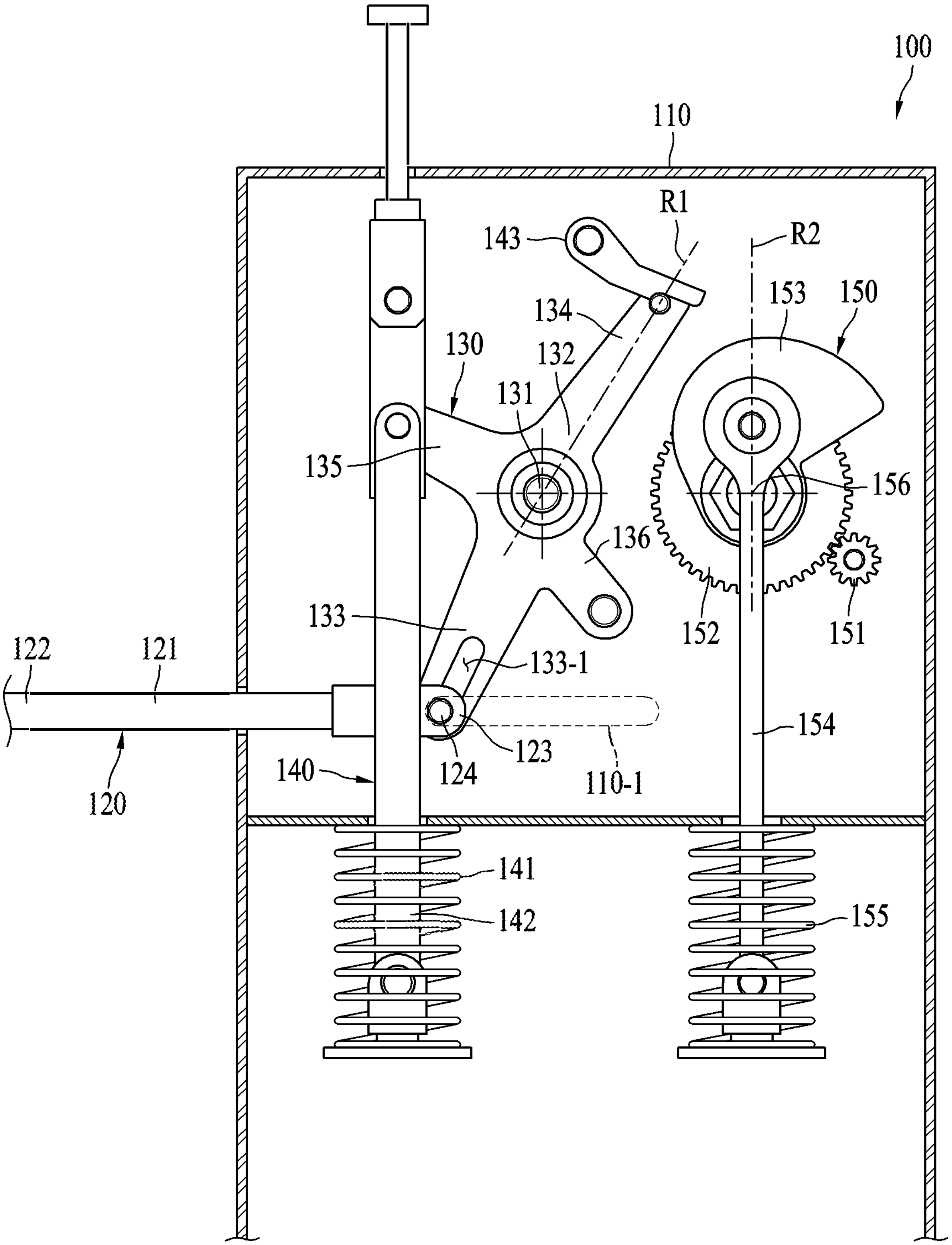
FIG. 2 is a diagram schematically illustrating the manipulator according to an embodiment.

FIG. 2 is a diagram schematically illustrating the manipulator 100 according to an embodiment. The manipulator 100 according to an embodiment may include a housing 110 in which components of the manipulator 100 may be accommodated, a rotation unit 130 that is disposed in the housing 110 and may rotate, a linear unit 120 that may be connected to the rotation unit 130, a blocking induction portion 140 which may induce blocking of a current and a portion of which may be connected to a portion of the rotation unit 130, and an input induction portion 150 which may induce input of a current and a portion of which may be connected to a portion of the rotation unit 130.

The shape of the housing 110 of the manipulator 100 according to an embodiment may vary. The housing 110 may protect the components of the manipulator 100 from an external environment by accommodating at least some of the above-mentioned components inside.

In addition, the housing 110 may include components for guiding the component (e.g., the rotation unit 130, the linear unit 120, etc.) of which at least a portion may be disposed in the housing 110. For example, the housing 110 may include a guide hole 110-1 formed on one side of the housing

110 to guide the linear motion of the linear unit 120. The guide hole 110-1 is described below.

The rotation unit 130 of the manipulator 100 according to an embodiment may rotate around a first axis 131.

Referring to FIG. 2, the rotation unit 130 is shown to have four arms protruding in various directions around a body 132, but the shape of the rotation unit 130 according to an embodiment is not limited thereto and may vary. For example, the rotation unit 130 may have a greater number of arms, and the rotation unit 130 may have a shape including a protrusion, concave, hole, and the like that may interact with other components having various shapes such as an ellipse, polygon, circle, and the like.

For example, the above-mentioned protrusion, concave, hole, and the like that may interact with other components may be an arm shape protruding in four different directions of FIG. 2.

For example, the rotation unit 130 may include a first arm 133 that may be connected to the linear unit 120.

Referring to FIG. 2, the linear unit 120 may include a body 121, a breaker connection portion 122 formed on one side of the body 121, and a rotation unit connection portion 123 formed on the other side of the body 121. The linear unit 120 may make a linear motion toward or away from the breaker 10 depending on the direction of rotation of the rotation unit 130. This is described below.

The rotation unit connection portion 123 may be connected to the first arm 133 via a pin-hole coupling. A hole 133-1 may be formed in one of the rotation unit connection portion 123 and the first arm 133, and a pin 124 may be formed in the other. For example, referring to FIG. 2, the hole 133-1 may be formed in the first arm 133 of the rotation unit 130 and the pin 124 may be formed in the rotation unit connection portion 123 of the linear unit 120.

For example, the pin 124 of the rotation unit connection portion 123 of the linear unit 120 may be connected to the hole 133-1 formed in the first arm 133 of the rotation unit 130 in an unconstrained manner. For example, the size of the pin 124 of the rotation unit connection portion 123 and the hole 133-1 of the first arm 133 may be determined so that a clearance is formed between the pin 124 and the hole 133-1 to allow a movement of the pin 124 of the rotation unit connection portion 123. For example, the hole 133-1 of the first arm 133 may be a slot. The shape of the slot may vary. For example, the slot may be formed in an elliptical shape. As described below, the hole 133-1 of the first arm 133 may allow a relative displacement of the pin 124 with respect to the hole 133-1 when a rotational motion of the rotation unit 130 is converted to the linear motion of the linear unit 120, thereby inducing a more natural linear motion and further increasing energy efficiency.

In addition, for example, the pin 124 may be connected to a guide hole 110-1 formed in the housing 110 in an unconstrained manner. The shape of the guide hole 110-1 may vary. For example, the above description on the hole 133-1 of the first arm 133 may apply to the guide hole 110-1. In addition, the guide hole 110-1 may guide a movement of the pin 124 when the rotational motion of the rotation unit 130 is converted to the linear motion of the linear unit 120 so that the linear unit 120 may make a smooth linear motion.

For example, the rotation unit 130 may include a second arm 134 located on the opposite side of the first arm 133 with respect to the first rotation axis 131, a third arm 135 located on one side with respect to a line connecting the first arm 133 and the second arm 134, and a fourth arm 136 located on the other side with respect to the line.

As mentioned above, the manipulator 100 according to an embodiment may include a blocking induction portion 140, and a portion of the blocking induction portion 140 may be connected to a portion of the rotation unit 130. For example, a portion of the blocking induction portion 140 may be connected to the second arm 134, and another portion of the blocking induction portion 140 may be connected to the third arm 135 or the fourth arm 136. Furthermore, as described below, when another portion of the blocking induction portion 140 is connected to the third arm 135, a portion of the input induction portion 150 may be connected to the fourth arm 136.

For example, the blocking induction portion 140 may include a checker 143 that may selectively fix the second arm 134, a blocking spring 141, and a blocking rod 142 that may be disposed in the blocking spring 141 in the longitudinal direction of the blocking spring 141.

The blocking rod 142 may be connected to the rotation unit 130 by being connected to the third arm 135 as mentioned above. The connection of the blocking rod 142 to the third arm 135 may be through a pin-hole coupling. The description on the pin-hole of the rotation unit 130 and the linear unit 120 described above may apply to the pin and the hole of the pin-hole coupling of the blocking rod 142 and the third arm 135.

One side of the blocking spring 141 may be connected to and supported by an arbitrary point in the housing 110, and the other side of the blocking spring 141 may be connected to one side of the blocking rod 142. Since the blocking rod 142 may move according to the rotation of the rotation unit 130, the portion of the blocking spring 141 connected to the blocking rod 142 may also move.

The checker 143 may be connected to the second arm 134 and support the second arm 134 so that the rotation unit 130 may not rotate. In FIG. 2, the blocking spring 141 is compressed. When the checker 143 is released, the rotation unit 130 may rotate and the blocking rod 142 connected to the rotation unit 130 may move and consequently, the blocking spring 141 may extend. As the compressed blocking spring 141 extends, the blocking rod 142 may be displaced by the force of the blocking spring 141 and accordingly, the rotation unit 130 may be able to rotate counterclockwise.

As described above, when the blocking induction portion 140 is connected to the second arm 134 and the third arm 135, the input induction portion 150 may be connected to the fourth arm 136.

The input induction portion 150 may include an input motor 151, an input sprocket 152 that may be driven by the input motor 151 and may rotate around a second rotation axis, and an input cam 153 coupled to the input sprocket 152, and may further include an auxiliary rod 154 connected to the input sprocket 152 or the input cam 153 and an auxiliary spring 155 disposed around an input rod.

Referring to FIG. 2, a gear directly connected to the input motor 151 is shown, and the input sprocket 152 connected to the gear of the input motor 151 is shown. A typical technician in the art may implement the configuration by changing the gear connected to the input motor 151 to a worm gear, as opposed to the one shown in FIG. 2.

The size of the input sprocket 152 may vary. In order to generate great power during a current input operation of the breaker 10, the input sprocket 152 of large size may be used to increase the ratio of gear to the input motor 151.

The input cam 153 may be coupled to the input sprocket 152 and may rotate with the input sprocket 152. The input cam 153 may be connected to the rotation unit 130 through a sliding contact. The input cam 153 may rotate with the input sprocket 152, through which the input cam 153 may rotate the rotation unit 130 by pushing the fourth arm 136.

On the contrary to the illustration of FIG. 2, the input rod, not the input cam 153, may be connected to the input sprocket 152. For example, one side of the input rod may be connected to the input sprocket 152 rather than the entire input rod being coupled to the input sprocket 152 in a constrained manner. The other side of the input rod may be connected to the fourth arm 136 of the rotation unit 130 through a pin-hole connection. The description on the pin-hole connection described above may apply to this case as well.

Similar to the blocking spring 141 described above, one side of the auxiliary spring 155 may be connected to and supported by an arbitrary point in the housing 110, and the other side of the auxiliary spring 155 may be connected to one side of the auxiliary rod 154. The auxiliary spring 155 and the auxiliary rod 154 may assist the input motor 151 in manipulation for inputting a current into the breaker 10.

Figure 3:
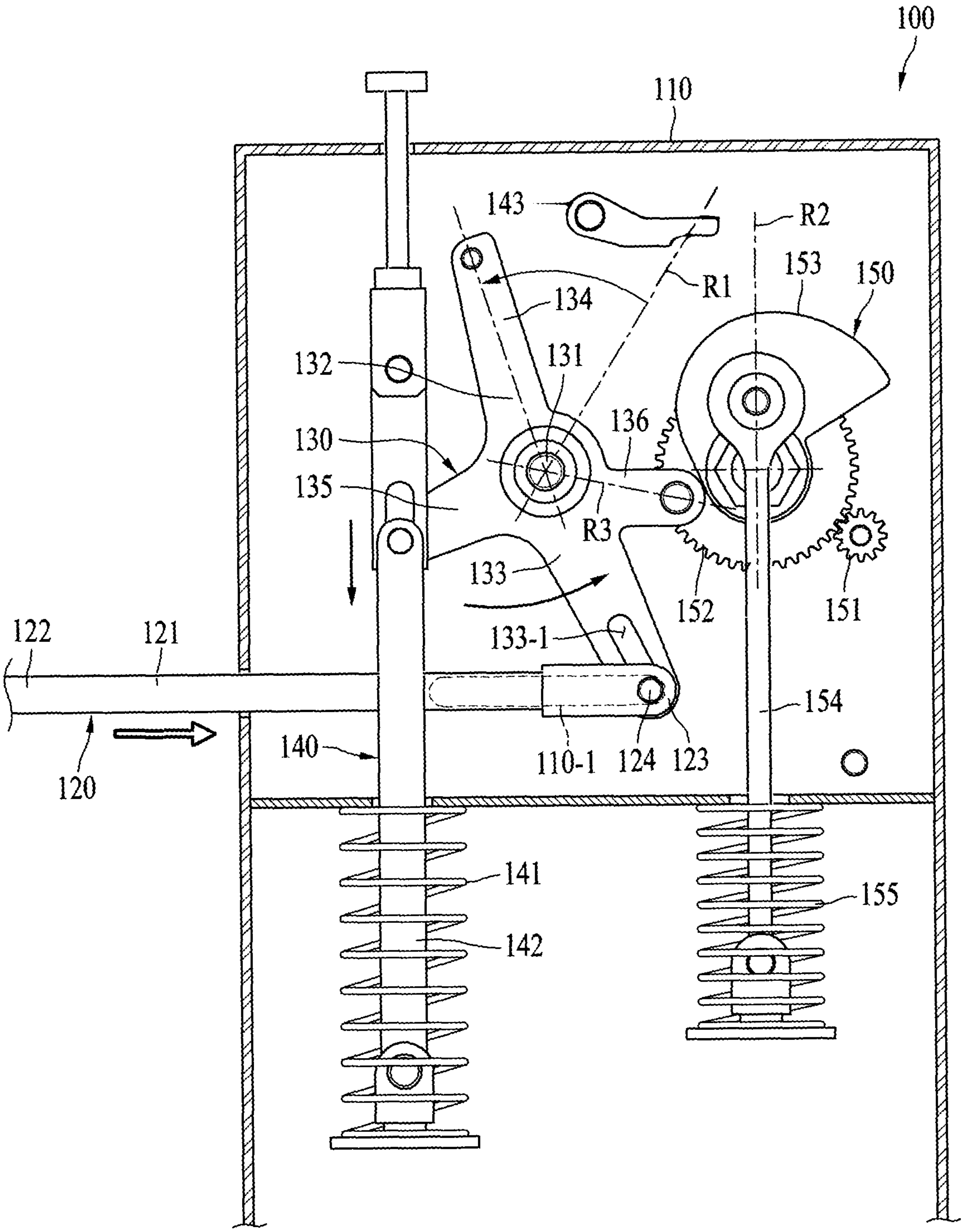
FIG. 3 is a diagram schematically illustrating a first mode of the manipulator according to an embodiment.
Figure 4:
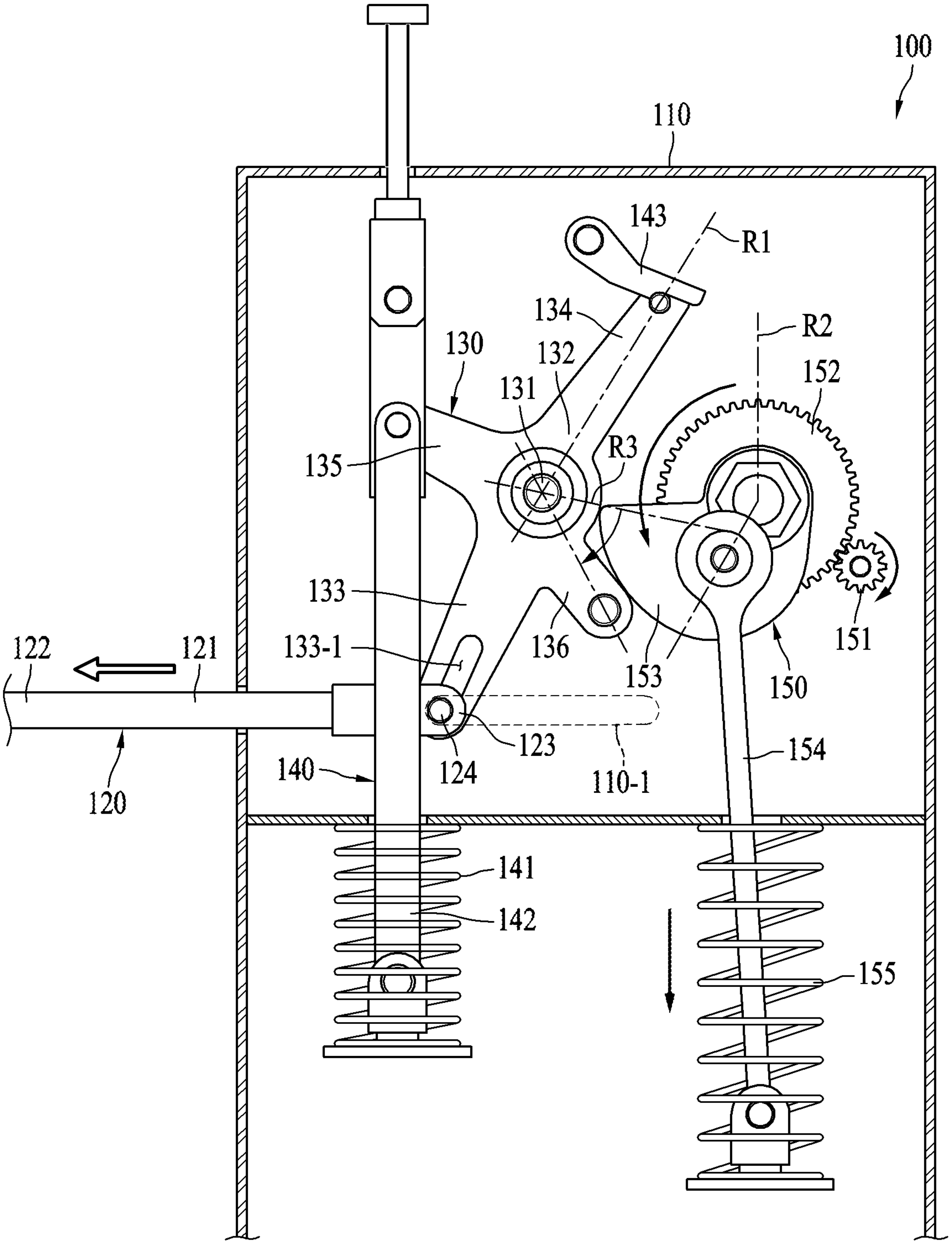
FIG. 4 is a diagram schematically illustrating a second mode of the manipulator according to an embodiment.

FIG. 3 is a diagram schematically illustrating a first mode of the manipulator 100 according to an embodiment, and FIG. 4 is a diagram schematically illustrating a second mode of the manipulator 100 according to an embodiment.

As described above, the manipulator 100 according to an embodiment may be applied to several pieces of equipment including the breaker 10 of the GIS 1, but the present disclosure describes the case of application to the breaker 10. Here, the first mode is a mode to block a current by activating the breaker 10, and the second mode is a mode to input a current by releasing the breaker 10.

Referring to FIGS. 2 to 4, baselines R1 and R3 of the rotation unit 130 and a baseline R2 of the input cam 153 are shown.

Referring to FIGS. 2 and 4, since the baseline R1 is shown passing through the second arm 134, it may be determined that the degrees of rotation of the rotation unit 130 of the manipulator 100 in FIGS. 2 and 4 are the same. Thus, like FIG. 4, FIG. 2 also illustrates the manipulator 100 in a state in which a current is input.

FIG. 3 illustrates the manipulator 100 in an input mode as in FIG. 2 changing into a blocking mode through the rotation of the rotation unit 130, and FIG. 4 illustrates the manipulator 100 in the blocking mode as in FIG. 3 changing into the input mode again through the rotation of the rotation unit 130 due to the input cam 153.

For example, the blocking induction portion 140 may induce blocking of a current by rotating the rotation unit 130 in one direction, the input induction portion 150 may induce input of a current by rotating the rotation unit 130 in another direction, and the linear unit 120 may be displaced away from the breaker 10 when blocking of a current is induced and displaced toward the breaker 10 when input of a current is induced.

For example, referring to FIG. 3, when the checker 143 is released, the blocking spring 141 that has been loaded may expand and extend, the blocking rod 142 may be displaced due to the extension of the blocking spring 141, the rotation unit 130 may rotate counterclockwise, and as a result, the linear unit 120 connected to the rotation unit 130 may be displaced away from the breaker 10.

As described above, the hole 133-1 of the first arm 133 may allow a relative displacement of the pin 124 with respect to the hole 133-1 and a relative displacement of the housing 110 with respect to the guide hole 110-1 as well when the rotational motion of the rotation unit 130 is converted to the linear motion of the linear unit 120, thereby inducing a more natural linear motion and further increasing energy efficiency.

For example, referring to FIG. 4, when the input motor 151 rotates, the input sprocket 152 connected thereto may rotate counterclockwise by the power of the rotating input motor 151 and also by the force from the auxiliary spring 155, the input cam 153 coupled to the input sprocket 152 may rotate counterclockwise, and the input cam 153 may push the fourth arm 136 of the rotation unit 130 to rotate the rotation unit 130 clockwise, thereby displacing the linear unit 120 toward the breaker 10.

The manipulator 100 according to an embodiment may effectively manipulate the breaker 10. For example, the breaker 10 needs to be able to block a current at a high speed since the breaker 10 is a component for blocking a current in the GIS 1 and is generally used in situations in which a very high-voltage current is flowing. The manipulator 100 according to an embodiment does not include any other component between the rotation unit 130 and the linear unit 120 so that the manipulator 100 may transmit the rotational motion of the rotation unit 130 directly to the linear unit 120. Thus, the energy transfer efficiency may be high, and the manipulator 100 may operate the breaker 10 with a faster manipulation.

In addition, since the manipulator 100 according to an embodiment does not include a separate component between the rotation unit 130 and the linear unit 120 to, for example, convert a rotational motion to a linear motion, the manipulator 100 according to an embodiment may be smaller in size than the manipulator 100 which includes a separate component. Through the configuration, the manipulator 100 according to an embodiment may reduce cost and have a small size. Due to the small size, the area of installation may also be reduced.

In addition, as described above, since the manipulator 100 according to an embodiment does not include the separate component to convert a rotational motion to a linear motion, the risk of failure that may occur in such a conversion configuration may be reduced, and the manipulator 100 may be more stable.

While the embodiments are described with reference to a limited number of drawings, it will be apparent to one of ordinary skill in the art that various alterations and modifications in form and details may be made in these embodiments without departing from the spirit and scope of the claims and their equivalents. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and equivalents to the claims are also within the scope of the following claims.

The invention claimed is:

1. A manipulator manipulating a breaker, the manipulator comprising:

a housing;

a rotation unit disposed in the housing and having a first rotation axis; and a linear unit of which at least a portion is disposed in the housing and which performs a linear motion with respect to the breaker;

a blocking induction portion having configured to induce blocking of a current; and an input induction portion configured to induce input of the current, wherein a portion of the blocking induction portion is connected to a second portion of the rotation unit, and a portion of the input induction portion is connected to a third portion of the rotation unit, wherein one side of the linear unit is connected to the breaker, and an other side of the linear unit is connected to a first portion of the rotation unit, wherein the rotation unit comprises:

a first arm directly connected to the linear unit;

a second arm located on an opposite side of the first arm with respect to the first rotation axis;

a third arm located on one side with respect to a line connecting the first arm and the second arm; and a fourth arm located on an other side with respect to the line, wherein the input induction portion, including an input cam, is directly connected to the fourth arm.

2. The manipulator of claim 1, wherein a hole is formed in one of the other side of the linear unit and the first portion of the rotation unit;

a pin protrudes from the other of the other side of the linear unit and the first portion of the rotation unit and passes through the hole; and the pin is not constrained in the hole.

3. The manipulator of claim 2, wherein the hole is a slot having an oval shape.

4. The manipulator of claim 1, wherein the blocking induction portion is configured to induce blocking of the current by rotating the rotation unit in a determined direction;

the input induction portion is configured to induce input of the current by rotating the rotation unit in another direction; and the linear unit is configured to be displaced away from the breaker when blocking of the current is induced and displaced toward the breaker when input of the current is induced.

5. The manipulator of claim 4, wherein the blocking induction portion comprises:

a blocking spring; and a blocking rod disposed in the blocking spring in a longitudinal direction of the blocking spring, wherein the blocking rod is connected to the rotation unit through a pin-hole connection, and the blocking spring is configured to displace the blocking rod by extending from a loaded state.

6. The manipulator of claim 5, wherein the input induction portion comprises:

an input motor;

an input sprocket driven by the input motor and having a second rotation axis; and an input cam coupled to the input sprocket, wherein the input cam is connected to the third portion of the rotation unit through a sliding contact, configured to rotate as the input sprocket rotates, and configured to rotate the rotation unit by pushing the third portion of the rotation unit.

7. The manipulator of claim 6, wherein the rotation unit comprises:

wherein the blocking induction portion further comprises a checker configured to selectively fix the second arm, and wherein the third arm is connected to the blocking rod.

8. The manipulator of claim 4, wherein the input induction portion comprises:

an input motor;

an input sprocket driven by the input motor and having a second rotation axis; and an input rod of which one side is connected to the input sprocket, wherein an other side of the input rod is connected to the rotation unit through a pin-hole connection.

9. A manipulator manipulating a breaker, the manipulator comprising:

a housing;

a rotation unit disposed in the housing and having a first rotation axis; and a linear unit of which at least a portion is disposed in the housing and which performs a linear motion with respect to the breaker;

wherein one side of the linear unit is connected to the breaker, and an other side of the linear unit is connected to a first portion of the rotation unit, a blocking induction portion configured to induce blocking of a current;

and an input induction portion configured to induce input of the current, wherein a portion of the blocking induction portion is connected to a second portion of the rotation unit, and a portion of the input induction portion is connected to a third portion of the rotation unit the blocking induction portion is configured to induce blocking of the current by rotating the rotation unit in a determined direction;

the input induction portion is configured to induce input of the current by rotating the rotation unit in another direction; and the linear unit is configured to be displaced away from the breaker when blocking of the current is induced and displaced toward the breaker when input of the current is induced, wherein the blocking induction portion comprises:

a blocking spring; and a blocking rod disposed in the blocking spring in a longitudinal direction of the blocking spring, wherein the blocking rod is connected to the rotation unit through a pin-hole connection, and the blocking spring is configured to displace the blocking rod by extending from a loaded state, wherein a hole of the pin-hole connection of the blocking rod to the rotation unit is a slot having an oval shape.

10. The manipulator of claim 9, wherein the input induction portion comprises:

an input motor;

an input sprocket driven by the input motor and having a second rotation axis; and an input rod of which one side is connected to the input sprocket, wherein an other side of the input rod is connected to the rotation unit through a pin-hole connection.

11. The manipulator of claim 10, wherein the input induction portion comprises:

the input motor;

the input sprocket driven by the input motor and having the second rotation axis; and an input cam coupled to the input sprocket, wherein the input cam is connected to the third portion of the rotation unit through a sliding contact, configured to rotate as the input sprocket rotates, and configured to rotate the rotation unit by pushing the third portion of the rotation unit.

12. The manipulator of claim 11, wherein the rotation unit comprises:

a first arm connected to the linear unit;

a second arm located on an opposite side of the first arm with respect to the first rotation axis;

a third arm located on one side with respect to a line connecting the first arm and the second arm; and a fourth arm located on an other side with respect to the line, wherein the blocking induction portion further comprises a checker configured to selectively fix the second arm, wherein the third arm is connected to the blocking rod, and wherein the fourth arm is connected to the input cam.

* * * * *